United States Patent
Shatters et al.

(10) Patent No.: US 11,341,440 B2
(45) Date of Patent: May 24, 2022

(54) WORK ORDER INTEGRATION SYSTEM

(71) Applicant: Caterpillar Inc., Peoria, IL (US)

(72) Inventors: Aaron R. Shatters, Montgomery, IL (US); Donald M. Weinhold, Peoria, IL (US); Gautham Subramanian, Peoria, IL (US); Michael A. Spielman, Jr., Brookfield, IL (US); Sucheta Chitgopekar, Hoffman Estates, IL (US)

(73) Assignee: Caterpillar Inc., Peoria, IL (US)

( * ) Notice: Subject to any disclaimer, the term of this patent is extended or adjusted under 35 U.S.C. 154(b) by 60 days.

(21) Appl. No.: 16/710,974

(22) Filed: Dec. 11, 2019

(65) Prior Publication Data

US 2021/0182753 A1 Jun. 17, 2021

(51) Int. Cl.
*G06Q 10/06* (2012.01)
*G06Q 10/08* (2012.01)

(52) U.S. Cl.
CPC ... *G06Q 10/06313* (2013.01); *G06Q 10/0639* (2013.01); *G06Q 10/08* (2013.01); *G06Q 10/08355* (2013.01)

(58) Field of Classification Search
None
See application file for complete search history.

(56) References Cited

U.S. PATENT DOCUMENTS

| | | | |
|---|---|---|---|
| 2016/0334236 A1* | 11/2016 | Mason | G08G 1/22 |
| 2017/0236221 A1* | 8/2017 | Davidson | G06Q 10/0875 705/7.23 |
| 2018/0108094 A1* | 4/2018 | Poole | G06Q 50/02 |
| 2018/0158016 A1* | 6/2018 | Pandya | G05B 19/41895 |
| 2019/0303848 A1* | 10/2019 | Schoening | G06K 7/10336 |
| 2020/0150687 A1* | 5/2020 | Halder | G05D 1/0088 |

* cited by examiner

*Primary Examiner* — Patricia H Munson
*Assistant Examiner* — Marjorie Pujols-Cruz
(74) *Attorney, Agent, or Firm* — Harrity & Harrity LLP (57) ABSTRACT

A work machine control device including a memory and a processor is disclosed. The processor may be configured to receive work order data associated with a haul machine. The work order data may identify the haul machine, a material requested for the haul machine, an amount of the material requested for the haul machine, and/or a work machine associated with the material. The processor may be configured to set an operating parameter of the work machine to perform an operation according to the work order data, and receive payload data associated with a payload of the work machine. The payload data may relate to a weight of the payload, a volume of the payload, and/or an operating state of the work machine. The processor may be configured to determine productivity data associated with the operation, and cause an action to be performed in connection with the productivity data.

20 Claims, 6 Drawing Sheets

WORK ORDER INTEGRATION SYSTEM

TECHNICAL FIELD

The present disclosure relates generally to quarry operations and, for example, to a work order integration system for quarry operations.

BACKGROUND

A quarry is a type of worksite (e.g., an open-pit mine) in which material (e.g., dimension stone, rock, construction aggregate, riprap, sand, gravel, slate, and/or the like) is excavated from earth. In a quarry operation, a variety of work machines (e.g., wheel loaders, track type tractors, dozers, excavators, off-highway trucks, drills, conveyor systems, and/or the like) may work together to extract different types of materials from the worksite and supply the materials to haul machines dispatched by customers. A quarry can have several stockpiles of a particular material and/or of different types of materials that are located throughout the worksite and ready to be loaded onto a haul machine by a wheel loader and/or another work machine. For instance, a wheel loader may be stationed near a stockpile and on standby until a haul machine approaches the stockpile and requests material from the stockpile. Once a request for the material is received, a wheel loader operator may use a bucket and/or another implement of the wheel loader to load the haul machine with a requested amount of the material.

Operators within a quarry may implement a ticketing system to track work orders submitted by customers and/or haul machine operators and facilitate the quarry operation. For example, a quarry may have a weigh station that is located near an entrance of the worksite that receives a work order from a haul machine operator, weighs the haul machine, and determines a tare weight of the haul machine. The work order may identify a type and an amount (e.g., a weight and/or a volume) of material requested by the haul machine operator. Once the haul machine is loaded with the appropriate type and amount of the material, the haul machine may be weighed again at the weigh station or a separate weigh station prior to completing a transaction for the material. The weigh station may determine a final weight of the haul machine, determine a difference between the tare weight and the final weight, and calculate a total weight of the material that has been loaded onto the haul machine based on the difference.

In some cases, the work order that is received by the weigh station may not be sufficiently communicated to wheel loader operators within the worksite. In such cases, wheel loader operators may need to rely on informal cues from haul machine operators to determine whether to load a material onto a haul machine and type and quantity of the material to load onto the haul machine. For instance, a haul machine operator may stop and/or position the haul machine near a stockpile to signal to wheel loader operators to load material from the stockpile. Wheel loader operators may correspondingly assume the haul machine operator is requesting material from the stockpile, and load the material from the stockpile onto the haul machine until the haul machine operator signals to the wheel loader operator to stop loading (e.g., via hand signals, verbal communication, and/or the like). Such an approach is inefficient and prone to error (e.g., a wheel loader operator may misinterpret cues from a haul machine operator and load an incorrect type and/or amount of material onto a haul machine).

In some cases, the work order may be electronically transmitted to wheel loader operators. The work order may include some information for identifying the haul machine associated with the work order, a type of material requested for the haul machine, and a target weight of material to be provided to the haul machine. The wheel loader operator stationed at the corresponding stockpile of the material may use the work order information to identify the haul machine and load the haul machine with the material according to the target weight. In some cases, the wheel loader may be provided with an on-board scale system that enables the wheel loader operator to measure a weight of material loaded into a bucket of the wheel loader, and track the weight of material loaded onto the haul machine against the target weight. Electronic transmission of work orders may enable wheel loader operators to have a better indication of the type and the amount of material to load, and the haul machine to load. However, currently available ticketing systems are still deficient in several respects.

Currently available ticketing systems do not provide sufficient mapping, inventory, and/or other worksite information which may be useful for haul machine operators. For instance, a haul machine operator may be unfamiliar with a worksite and may neither know general area where a given stockpile is located, nor the exact location of stockpile and/or which stockpile contains the desired material in desired quantities. In some cases, the worksite may have several stockpile locations for a particular material, and some stockpile locations may have longer wait times (e.g., longer queues of haul machines waiting to be loaded with the material) than other stockpile locations. In other cases, the worksite may not have sufficient material sought by a haul machine operator, but may not have means to inform the haul machine operator of the material shortage. As a result, a haul machine operator may spend time and resources traveling from stockpiles to stockpiles before identifying a specific stockpile that contains the desired material in desired quantity. Even after reaching the specific stockpile, the haul machine may end up waiting in queue before realizing that the worksite does not have sufficient inventory of the material requested. In such cases, the haul machine operator may waste time, fuel, and/or other resources searching for the correct stockpile and/or unnecessarily waiting in queue for material.

Currently available ticketing systems are also not sufficiently integrated with individual work machines. For instance, an accuracy of a loading operation performed by a wheel loader relies on manual input and/or configuration by a wheel loader operator (e.g., of a target weight and/or another operating parameter). In some cases, the wheel loader operator may input an incorrect operating parameter such as material type and/or target weight, and load a haul machine with an incorrect type or amount of material. As a result, excess time, fuel, and/or other resources may be needed to unload the haul machine, and to reload the haul machine with the correct material. In some cases, a haul machine operator may manipulate a weight of the material loaded onto the haul machine to save on material costs. For instance, a haul machine operator may add or remove weight from a bed of the haul machine in a manner that increases a tare weight and/or decreases a final weight of the haul machine to reduce an apparent weight of the loaded material. Currently available ticketing systems are unable to detect such inconsistencies and validate an actual weight of the loaded material.

A work order integration system of the present disclosure overcomes one or more shortcomings set forth above.

SUMMARY

According to some implementations, a work machine control device may include one or more memories; and one or more processors, communicatively coupled to the one or more memories, configured to receive work order data associated with a haul machine, the work order data identifying one or more of the haul machine, a type of material requested for the haul machine, an amount of the material requested for the haul machine, or a work machine associated with the material; set an operating parameter of the work machine to perform an operation according to the work order data; receive payload data associated with a payload of the work machine, the payload data relating to one or more of a weight of the payload, a volume of the payload, or an operating state of the work machine; determine productivity data associated with the operation based on the payload data; and cause an action to be performed in connection with the productivity data.

According to some implementations, a worksite management device may include one or more memories; and one or more processors, communicatively coupled to the one or more memories, configured to determine a location of a haul machine relative to a worksite; determine work order data associated with the haul machine, the work order data identifying a type of material requested for the haul machine and an amount of the material requested for the haul machine; determine an availability of the amount of the material requested for the haul machine; identify a location of the material based on determining that the amount of the material is available; select a path between the location of the haul machine and the location of the material; and cause an action to be performed based on the path.

According to some implementations, a method may include determining, by a device, a location of a haul machine relative to a worksite; determining, by the device, work order data associated with the haul machine, the work order data identifying one or more of the haul machine, a material requested for the haul machine, or an amount of the material requested for the haul machine; determining, by the device, an availability of the amount of the material requested for the haul machine; identifying, by the device, a location of the material based on determining that the amount of the material is available; selecting, by the device, a path between the location of the haul machine and the location of the material; and transmitting, by the device, information relating to the path to the haul machine; identifying, by the device, a work machine associated with the material requested for the haul machine; and transmitting, by the device, the work order data to the work machine.

DETAILED DESCRIPTION

Figure 1:
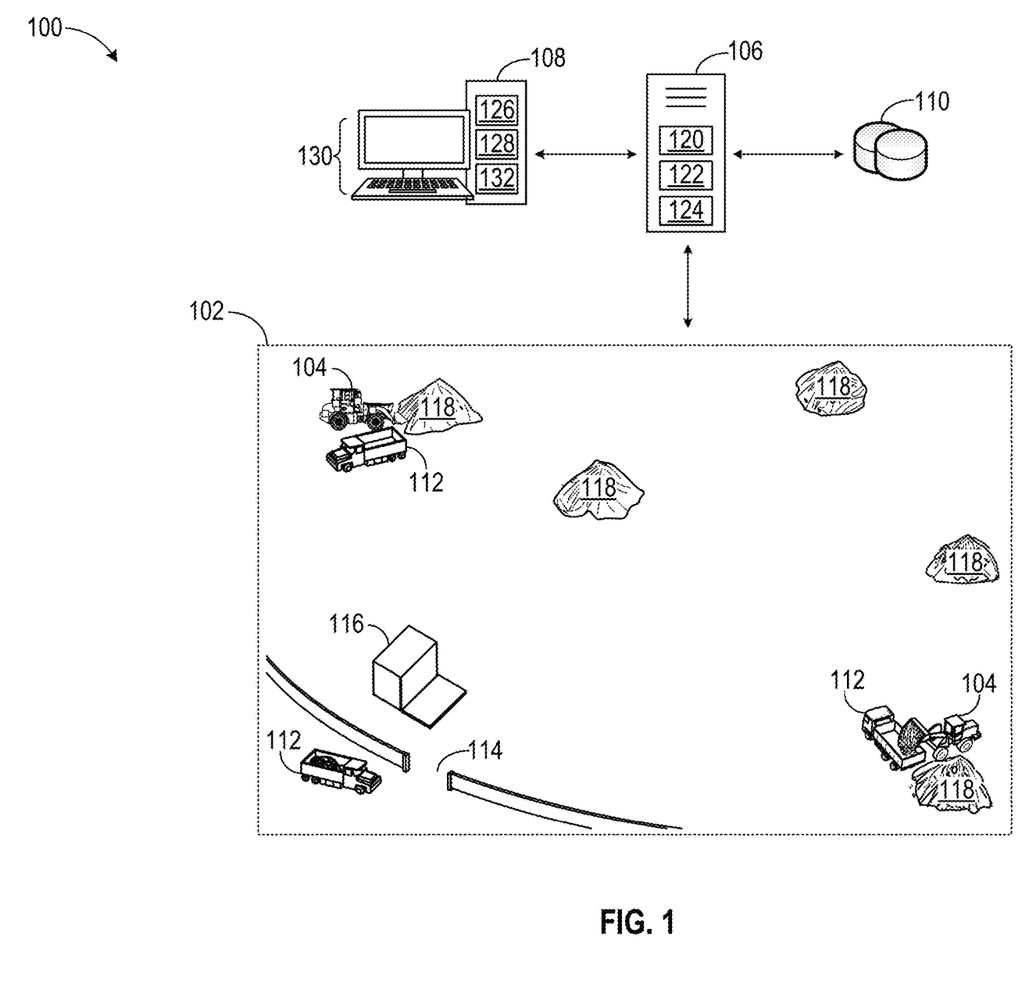
FIG. 1 is a diagram of an example work order integration system described herein.

FIG. 1 is a diagram of an example work order integration system 100 described herein. As shown in FIG. 1, work order integration system 100 may be used to manage and/or facilitate an operation within a worksite 102, and include a work machine 104, a management platform 106 (e.g., a worksite management device), a control station 108, and/or a network storage device 110. Worksite 102 may correspond to a quarry site (e.g., an open-pit mine and/or the like) from which material (e.g., dimension stone, rock, construction aggregate, riprap, sand, gravel, slate, and/or the like) can be excavated and supplied to haul machines 112 as part of a quarry operation. In some examples, worksite 102 may correspond to a crushing site, a block handling site, a waste transfer site, a construction site, and/or the like. Worksite 102 may include one or more entryways 114 through which haul machines 112 may enter or exit worksite 102, one or more weigh stations 116 for weighing haul machines 112, and one or more stockpiles 118 of a single type of material and/or of different types of materials extracted from worksite 102.

As further shown in FIG. 1, worksite 102 may be configured such that haul machine 112 needing material can enter worksite 102 via entryway 114 and check-in at weigh station 116 to submit a work order for the material. An operator of weigh station 116 may receive the work order and weigh haul machine 112 to determine a tare weight of haul machine 112. In another embodiment of the disclosed invention, management platform 106 and/or control station 108 may receive and/or determine a tare weight and/or other check-in data associated with haul machine 112 via direct and/or indirect wired and/or wireless communication with haul machine 112. Haul machine 112 may proceed to one of stockpiles 118 corresponding to the material specified in the work order, and work machine 104 may initiate a loading operation to load haul machine 112 with an amount of the material specified in the work order. Once the loading operation is complete, haul machine 112 may return to weigh station 116 to complete check-out procedures. The operator of weigh station 116 may weigh haul machine 112 to determine a final weight of haul machine 112, confirm the type of material and the weight of the material loaded onto haul machine 112 based on the tare weight and the final weight of haul machine 112, and complete a transaction for the work order. Once the transaction is complete, haul machine 112 may exit worksite 102 via entryway 114. Furthermore, upon completing the transaction, information relating to the transaction may be used to update work order data, inventory data, productivity data, and/or the like, and communicated to work machine 104, management platform 106, control station 108, and/or network storage device 110.

In some implementations, work order integration system 100 may provide and/or support a work order integration service that receives work order data relating to material requested for haul machines 112, communicates the work order data to work machines 104, monitors productivity data of work machines 104, monitors inventory data (e.g., types, amounts, and/or locations of materials available within worksite 102), and/or the like. The work order integration service may provide the work order data, the productivity data, and/or the inventory data to an operator, a site foreman, a supervisor, and/or another subscriber to the work order integration service in a form of a report, a graphical representation, a digital model (e.g., a two-dimensional digital model and/or a three-dimensional digital model), and/or the like. The work order data, the productivity data, and/or the inventory data may be updated intermittently, periodically, and/or continuously in real-time, and made accessible to a local operator (e.g., via a user interface associated with work machine 104, haul machine 112, and/or weigh station 116)

and/or to a remote operator (e.g., via a user interface associated with control station 108).

In some implementations, work order integration system 100 may include multiple work machines 104, multiple control stations 108, multiple management platforms 106, and/or multiple network storage devices 110. In some examples, work order integration system 100 may operate in conjunction with multiple haul machines 112, multiple worksites 102, and/or multiple weigh stations 116. Work order integration system 100 may be used with manually operated work machines 104 and/or haul machines 112, and/or autonomously or semi-autonomously operated work machines 104 and/or haul machines 112. For example, work order integration system 100 may be used to guide, navigate, and/or control a control device of an autonomous or a semi-autonomous work machine 104 and/or haul machine 112 based on location data associated with work machine 104, haul machine 112, weigh station 116, stockpiles 118 within worksite 102, and/or the like. In some examples, a control device of work machine 104 and/or haul machine 112 may receive guidance, navigation, and/or control information from a local operator and/or from a remote operator via control station 108.

As further shown in FIG. 1, management platform 106 includes a processor 120, a memory 122, and a communication device 124. Processor 120 is implemented in hardware, firmware, and/or a combination of hardware and software capable of being programmed to perform a function associated with work order integration system 100. Memory 122 includes a random-access memory (RAM), a read only memory (ROM), and/or another type of dynamic or static storage device that stores information and/or instructions to be performed by processor 120. Communication device 124 includes a local area network (LAN) component (e.g., an Ethernet component), a wireless local area network (WLAN) component (e.g., a Wi-Fi component), a radio frequency (RF) communication component (e.g., a Bluetooth component), a positioning component (e.g., a global positioning system (GPS) component, a global navigation satellite system (GNSS) component), and/or the like. Communication device 124 may enable processor 120 to exchange work order data, inventory data, productivity data, and/or other information relating to worksite 102 with work machine 104, control station 108, network storage device 110, haul machine 112, and/or weigh station 116.

As further shown in FIG. 1, control station 108 includes a processor 126, a memory 128, a user interface 130, and a communication device 132. Processor 126 is implemented in hardware, firmware, and/or a combination of hardware and software capable of being programmed to perform a function associated with work order integration system 100. Memory 128 includes a RAM, a ROM, and/or another type of dynamic or static storage device that stores information and/or instructions to be performed by processor 126. User interface 130 includes an input device and an output device. User interface 130 may enable an operator associated with worksite 102 to specify an instruction, a command, and/or another operating parameter for operating work machine 104. The input device may enable an operator to specify an instruction, a command, and/or other information for facilitating an operation associated with worksite 102. The output device may enable an operator to access work order data, inventory data, productivity data, and/or other information associated with an operation of worksite 102.

Communication device 132 includes a LAN component, a WLAN component, an RF communication component, a positioning component, and/or the like. Communication device 132 may enable processor 126 to exchange information relating to work order data, inventory data, productivity data, and/or other information relating to worksite 102 with work machine 104, management platform 106, network storage device 110, haul machine 112, and/or weigh station 116. In some examples, communication device 132 may enable processor 126 to communicate with work machine 104, haul machine 112, weigh station 116, and/or network storage device 110 directly and/or indirectly via management platform 106. Additionally, or alternatively, user interface 130 and/or communication device 132 may enable control station 108 to serve as a user interface of management platform 106. In some examples, control station 108 may be provided on-board and/or otherwise in association with work machine 104, haul machine 112, weigh station 116, and/or another device associated with worksite 102.

As further shown in FIG. 1, network storage device 110 includes one or more devices capable of storing, processing, and/or routing information. Network storage device 110 may include, for example, a server device, a device that stores a data structure, a device in a cloud computing environment or a data center, and/or the like. Network storage device 110 may store information relating to work order data, inventory data, productivity data, and/or other information associated with an operation associated with worksite 102. In some examples, network storage device 110 may store worksite data (e.g., information identifying locations of stockpiles 118 within worksite 102, work machines 104 assigned to stockpiles 118, locations of work machines 104, weigh station 116, and/or haul machines 112), and/or other reference information that can be used to facilitate an operation associated with worksite 102. Network storage device 110 may include a communication interface that allows network storage device 110 to exchange information with work machine 104, management platform 106, control station 108, haul machine 112, weigh station 116, and/or another device associated with work order integration system 100.

As indicated above, FIG. 1 is provided as an example. Other examples may differ from what is described in connection with FIG. 1.

Figure 2:
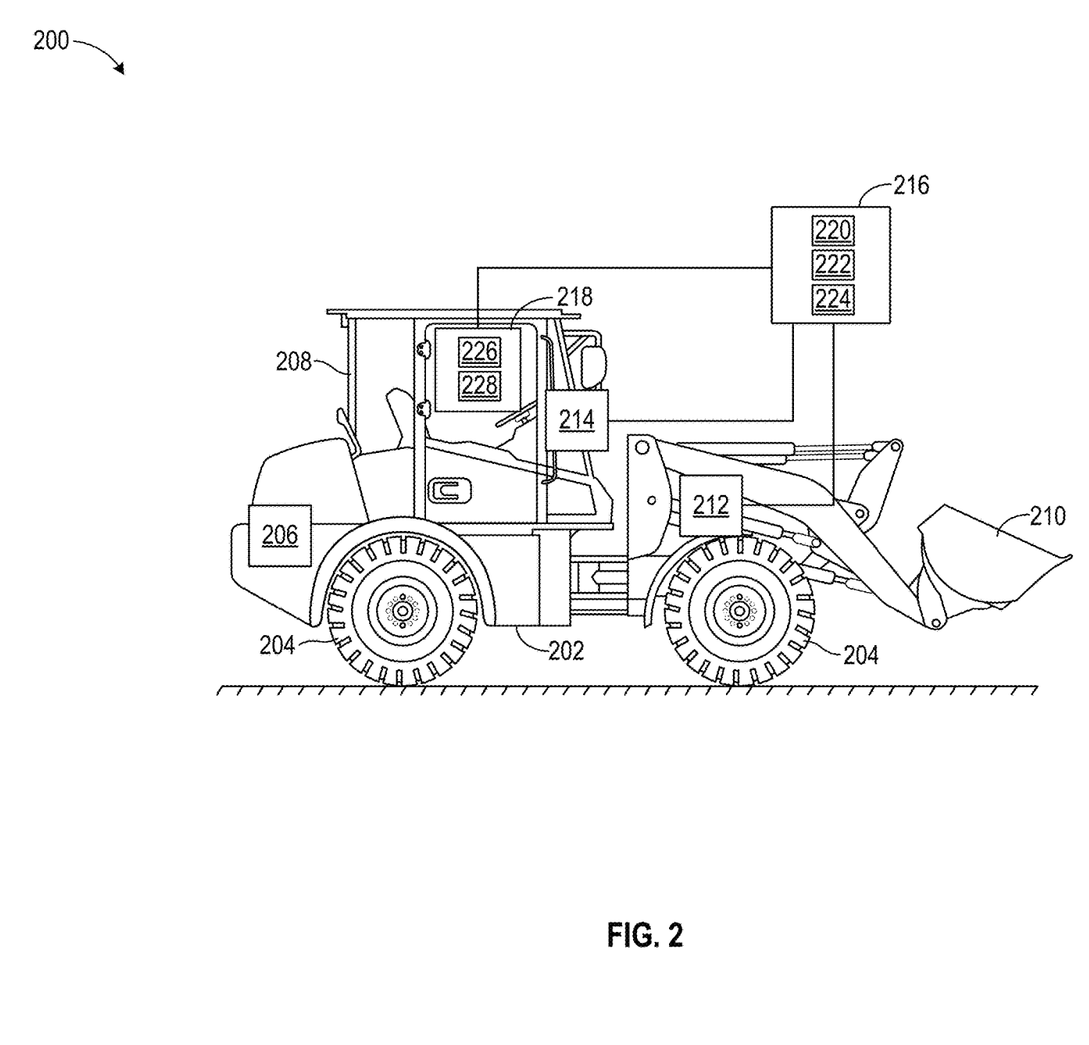
FIG. 2 is a diagram of an example work machine described herein.

FIG. 2 is a diagram of an example work machine 200 (e.g., work machine 104 in FIG. 1) described herein. Work machine 200 may correspond to a wheel loader, a track type tractor, a motor grader, a dozer, an excavator, and/or another type of machine suited to perform a loading operation within worksite 102. As shown in FIG. 2, work machine 200 includes a frame 202, traction elements 204, an engine 206, an operator cab 208, an implement 210, a payload measurement device 212, a machine sensor 214, and a control device 216. Traction elements 204 may include wheels or tracks that are coupled to frame 202 and driven by engine 206. Engine 206 may include a diesel engine, a gasoline engine, a natural gas engine, a hybrid engine, an electric motor, and/or another power source configured to drive traction elements 204. Operator cab 208 may be coupled to frame 202 and configured to support an operator of work machine 200 and a user interface 218 that enables the operator to control an operation of work machine 200. Implement 210 may include a bucket and/or another tool that is movably coupled to frame 202 and capable of performing a loading operation.

Payload measurement device 212 includes one or more sensor devices configured to measure a payload (e.g., a weight and/or a volume of material in implement 210) of work machine 200. For example, payload measurement device 212 may include a position sensor, an encoder, a pressure sensor, and/or the like that is coupled relative to implement 210 and/or an associated mechanism (e.g., an electrohydraulic mechanism, an electromechanical mechanism, a hydromechanical mechanism, and/or another mechanism that enables implement 210 to perform a loading operation). In some examples, one or more sensor devices of payload measurement device 212 may be disposed in relation to a lift cylinder assembly and/or a tilt cylinder assembly of implement 210. The sensors may provide payload data (e.g., information relating to a pressure, a displacement, a velocity, and/or another operating state and/or condition of implement 210) that can be used by payload measurement device 212 to measure the payload of work machine 200.

Machine sensor 214 includes one or more sensor devices configured to measure an operating state and/or condition of implement 210 and/or work machine 200. For example, machine sensor 214 may include a position sensor, an encoder, a pressure sensor, and/or the like that is coupled relative to traction elements 204, engine 206, implement 210, user interface 218, and/or another mechanism of work machine 200. Machine sensors 214 may be configured to determine a travel speed of work machine 200, an engine speed of engine 206, a position of implement 210 relative to work machine 200, and/or other information that can be used to determine whether work machine 200 is in use, whether work machine 200 is being driven, whether implement 210 is in use, whether work machine 200 has initiated a loading operation, whether work machine 200 has completed a loading operation, and/or the like. In some examples, machine sensor 214 may provide an operating time, a throttle position, a torque demand, an engine load, an oil pressure, a mass air flow rate, and/or another operation state and/or condition associated with work machine 200.

Control device 216 includes a processor 220, a memory 222, a communication device 224. Processor 220 is implemented in hardware, firmware, and/or a combination of hardware and software capable of being programmed to perform a function associated with work machine 200 and/or work order integration system 100. Memory 222 includes a RAM, a ROM, and/or another type of dynamic or static storage device that stores information and/or instructions to be performed by processor 220. Communication device 224 includes a WLAN component, an RF communication component, a positioning component, and/or the like. Communication device 224 may enable processor 220 to exchange work order data, inventory data, productivity data (e.g., provided via payload measurement device 212 and/or machine sensor 214), and/or other information relating to worksite 102 with management platform 106, control station 108, network storage device 110, haul machine 112, and/or weigh station 116. In some examples, control device 216 may communicate with control station 108 and/or network storage device 110 directly and/or indirectly via management platform 106.

In some implementations, control device 216 may include and/or communicate with user interface 218 of work machine 200. User interface 218 includes an input device 226 and an output device 228. Input device 226 may include a brake control pedal, a torque control pedal, a throttle control pedal, a clutch pedal, a direction control switch, a steering control lever, an implement control lever, a control panel, a touchscreen display, a microphone, and/or another device configured to receive input from an operator (e.g., an instruction, a command, and/or another operating parameter for operating work machine 200 and/or implement 210). Output device 228 may include a display, a speaker, a haptic device, and/or another device configured to provide information to an operator (e.g., work order data, inventory data, productivity data, worksite data, and/or the like). Output device 228 may provide the operator with information relating to haul machines 112 that are looking to upload material, such as a type and an amount of material requested by a specific haul machine 112, a target weight of a loading operation to be performed for a specific haul machine 112, a number of haul machines 112 in queue waiting to be loaded with material, a wait time associated with a queue, and/or the like.

In some implementations, control device 216 may be configured to receive work order data corresponding to material requested for haul machine 112. Control device 216 may receive the work order data directly from haul machine 112 and/or indirectly via another work machine 200, management platform 106, control station 108, network storage device 110, weigh station 116, and/or another device of work order integration system 100. As described in more detail below in connection with FIGS. 3A-3C, the work order data may include information relating to a type of material requested for haul machine 112, an amount of the material requested for haul machine 112, a haul machine identifier that identifies haul machine 112, a work machine identifier that identifies work machine 200 assigned to and/or otherwise associated with the material requested, a location of stockpile 118 corresponding to the material, a check-in time of haul machine 112, a check-in weight (e.g., a tare weight) of haul machine 112, and/or other information that can be used by an operator of work machine 200 to perform a loading operation. The work order data may correspond to a single work order for a single haul machine 112 or for a plurality of work orders for a plurality of haul machines 112.

In some implementations, control device 216 may be configured to generate a work order menu based on the work order data received, and cause the work order menu to be displayed to an operator of work machine 200 via user interface 218, as described in more detail below in connection with FIGS. 3A-3C. For example, user interface 218 may display one or more work order entries corresponding to the work order data, and receive a work order selection from the operator. Based on the work order selection, control device 216 may set one or more operating parameters of work machine 200 to perform a loading operation according to the work order data associated with the work order selection. For example, control device 216 may set a target weight associated with payload measurement device 212 according to an amount of material requested for haul machine 112. In some examples, control device 216 may set a target pass count (e.g., a number of implement passes needed to achieve the target weight), a target weight per pass (e.g., a weight per pass needed to minimize the pass count), a target volume of material requested for haul machine 112, and/or another operating parameter associated with a loading operation.

In some implementations, control device 216 may be configured to receive payload data associated with a payload of implement 210. For example, the payload data may include information relating to a weight of the payload, a volume of the payload, a pass count (e.g., a number of implement passes completed and/or remaining), an operating state and/or condition of implement 210 and/or work machine 200, and/or the like. Control device 216 may receive the payload data from payload measurement device 212 and/or machine sensor 214. In some examples, control device 216 may be configured to determine productivity data associated with the loading operation based on the payload data and the target weight. For example, the productivity data may include information relating to an amount of material loaded onto haul machine 112 and/or remaining in the loading operation, an amount of material loaded per implement pass, a number of implement passes performed and/or remaining for the loading operation, and/or other information that may be used to track a progress of the loading operation and/or operator performance.

In some implementations, control device 216 may be configured to cause an action to be performed in connection with the productivity data. For example, control device 216 may generate a graphical representation (e.g., a progress bar, a graph, a table, an icon, and/or another visual annotation of the productivity data) based on the productivity data. In some examples, control device 216 may be configured to receive check-out data provided by weigh station 116 during check-out of haul machine 112, and generate a graphical representation based on the productivity data and the check-out data. Control device 216 may be configured to transmit the graphical representation to be displayed via user interface 218. In some examples, control device 216 may be configured to generate a graphical representation of the work order data, the inventory data, the payload data, worksite data, and/or other information to be displayed via user interface 218. In some examples, control device 216 may transmit the graphical representation to another work machine 200, management platform 106, control station 108, network storage device 110, haul machine 112, and/or the like.

In some implementations, control device 216 may be configured to use the check-out data to determine a check-out time of haul machine 112, a check-out weight (e.g., a final weight) of haul machine 112, and/or other information associated with haul machine 112 determined by weigh station 116 during check-out. Control device 216 may determine an actual amount of material loaded onto haul machine 112 based on the check-out weight and the check-in weight, and compare the actual amount of material loaded onto haul machine 112 with a corresponding amount measured via payload measurement device 212. Based on the comparison, control device 216 may be able to validate a transaction for the material being performed at weigh station 116, determine an accuracy of the loading operation performed by work machine 200, and/or provide another assessment. In some examples, control device 216 may use the productivity data and/or the check-out data to determine a loading time (e.g., a duration of the loading operation), a hauling time (e.g., a time spent by haul machine 112 within worksite 102), and/or other information that may be useful to one or more operators associated with worksite 102.

As indicated above, FIG. 2 is provided as an example. Other examples may differ from what is described in connection with FIG. 2.

Figure 3A:
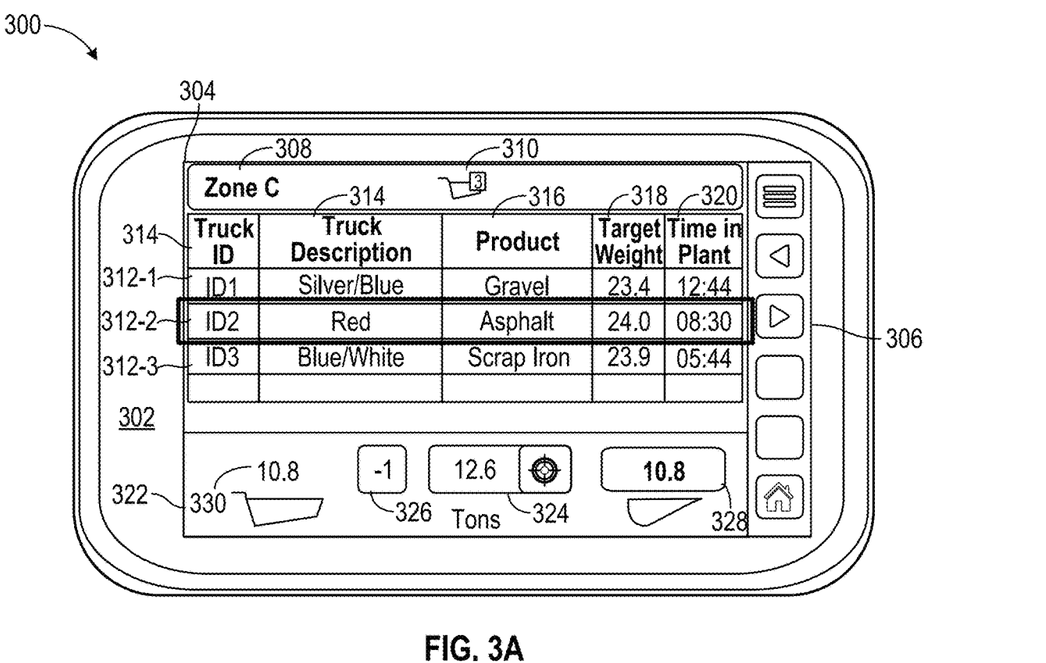
FIGS. 3A-3C are diagrams of an example implementation of a work machine control device described herein.

FIGS. 3A-3C are diagrams of an example implementation of a work machine control device 300 (e.g., control device 216 in FIG. 2) described herein. As shown in FIG. 3A, work machine control device 300 may provide a user interface 302 (e.g., user interface 218 in FIG. 2) configured to interact with an operator of work machine 200. User interface 302 may be implemented using a touchscreen display device and/or another device configured to output information to the operator and/or receive information from the operator. As shown for the example in FIG. 3A, user interface 302 may display a work order menu 304 that provides information relating to work order data, inventory data, payload data, productivity data, worksite data, and/or other information provided via work order integration system 100. User interface 302 may receive selections made by the operator within work order menu 304. In some examples, work order menu 304 may include a navigation pane 306 that enables the operator to switch between different views and/or sets of information that are available via work machine control device 300.

In some implementations, work order menu 304 may include location information 308, queue information 310, a work order entry 312, a haul machine identifier 314, material information 316, target weight information 318, hauling time information 320, and/or other relevant information. Location information 308 (e.g., Zone C) may identify a location of work machine 200 relative to worksite 102 and/or a location of stockpile 118 relative to worksite 102. Queue information 310 may identify a number of haul machines 112 waiting to be loaded with material from stockpile 118, an associated wait time, and/or the like. Work order entry 312 may identify a work order associated with work machine 200 and/or stockpile 118. Haul machine identifier 314 (e.g., Truck ID and/or Truck Description) may identify individual haul machines 112 in queue. Material information 316 (e.g., Product) may identify a type of material to load onto haul machine 112. Target weight information 318 may identify an amount of the material to be loaded onto haul machine 112. Hauling time information 320 may identify a time spent by haul machine 112 within worksite 102 (e.g., time elapsed since check-in and/or the like).

As shown for the example in FIG. 3A, work order menu 304 may present a work order entry 312-2 submitted by a haul machine 112 (e.g., a red haul truck identified as "ID2"). Work order entry 312-2 may be received directly from haul machine 112 and/or indirectly via weigh station 116, management platform 106, control station 108, and/or network storage device 110. As shown, work order entry 312-2 may include information identifying the product or the type of material requested by an operator of haul machine 112 (e.g., "Asphalt"), the target weight or the amount of the material requested (e.g., "23.0" tons), and the time in plant or the time haul machine 112 has spent within worksite 102 and since checking in at weigh station 116 (e.g., 8 minutes and 30 seconds). Although not shown in FIG. 3A, in some examples, work order entry 312-2 may additionally or alternatively identify a check-in time of haul machine 112, a check-in weight of haul machine 112, a work machine identifier (e.g., a machine identification number and/or another unique identifier) associated with work machine 200 assigned to and/or otherwise associated with the material requested.

In some implementations, work order menu 304 may enable an operator of work machine 200 to select one of the available work order entries 312 to access additional information relating to a work order and/or initiate a loading operation according to a work order selection. For example, user interface 302 may be configured to identify work order data associated with the work order selection, and cause one or more operating parameters of work machine 200, implement 210, payload measurement device 212, and/or the like to be set according to the work order data. In some examples, user interface 302 may transmit command signals (e.g., via control device 216) to cause the operating parameters to be set. The operating parameters may include a target weight associated with payload measurement device 212, a target pass count (e.g., a number of implement passes needed to achieve the target weight), a target weight per pass (e.g., a weight per pass needed to minimize the pass count), a target volume of material requested for haul machine 112, and/or another operating parameter associated with a loading operation.

In some implementations, work order menu 304 may include a payload dashboard 322 that uses payload data (e.g., provided by payload measurement device 212 and/or machine sensor 214) to track loads and/or passes during a loading operation. For example, payload dashboard 322 may include a target weight tracker 324, a pass counter 326, a payload measurement 328, a transferred load tracker 330, and/or the like. Target weight tracker 324 may identify an amount of material remaining in a loading operation. Pass counter 326 may identify a number of passes performed by work machine 200 during the loading operation. Payload measurement 328 may identify a weight of the payload of implement 210. Transferred load tracker 330 may identify a weight of material that has been loaded onto haul machine 112. In some examples, work order menu 304 may be made accessible to other work machines 104, management platform 106, control station 108, network storage device 110, weigh station 116, and/or another device of work order integration system 100. In such cases, work order menu 304 may include a work machine identifier that identifies individual work machines 104 that are assigned to and/or located in proximity to stockpile 118.

Figure 3B:
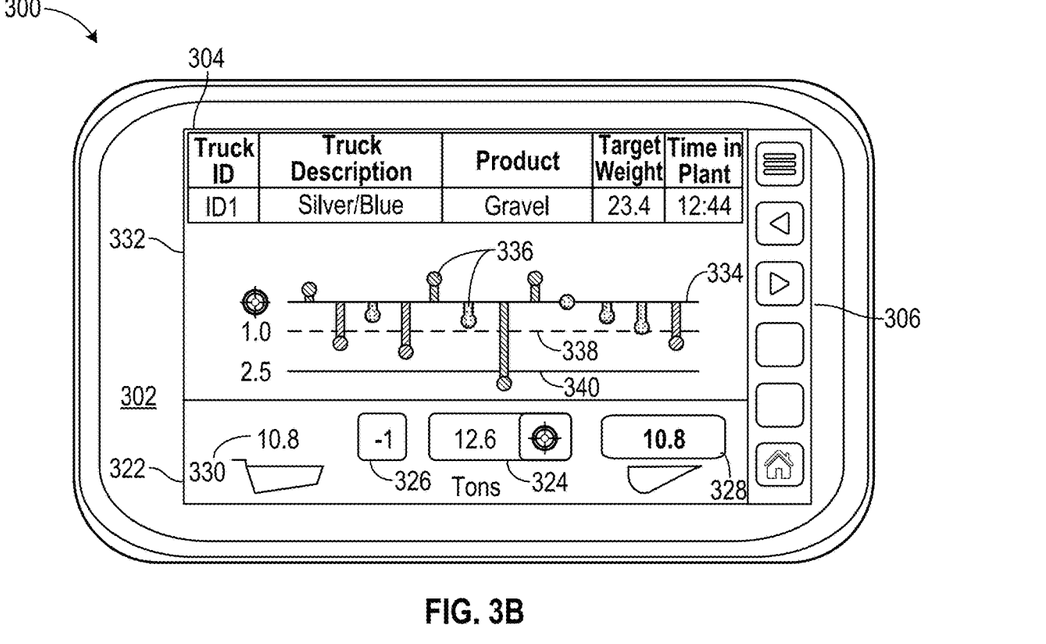

As shown in FIG. 3B, work order menu 304 may provide a productivity dashboard 332 relating to previous loading operations performed by work machine 200. Productivity dashboard 332 may include a target weight reference 334 and actual weight indicators 336. Target weight reference 334 may correspond to respective target weights of the loading operations. Actual weight indicators 336 may correspond to actual weights of material as determined by weigh station 116 (e.g., based on calculated differences between final weights and tare weights of haul machines 112). As shown for the example in FIG. 3B, actual weight indicator 336 may extend above target weight reference 334 when the actual weight of material on haul machine 112 was greater than the target weight used by work machine 200 during the loading operation, and actual weight indicator 336 may extend below target weight reference 334 when the actual weight of material on haul machine 112 was less than the target weight used by work machine 200 during the loading operation. A length of actual weight indicator 336 may indicate a degree of error between the actual weight and the target weight.

In some implementations, actual weight indicators 336 may be color-coded and/or otherwise annotated to indicate relative severity of the errors. For example, a nominal shortage (e.g., when actual weight indicator 336 extends below target weight reference 334, but above a first threshold 338 and a second threshold 340) may be considered acceptable and color-coded green. A moderate shortage (e.g., when actual weight indicator 336 extends below target weight reference 334 and first threshold 338, but above second threshold 340) may be considered a moderately severe error and color-coded yellow. A significant shortage (e.g., when actual weight indicator 336 extends below target weight reference 334, first threshold 338, and second threshold 340) may be considered a severe error and color-coded red. An overage (e.g., when actual weight indicator 336 extends above target weight reference 334) may be considered a severe error irrespective of the amount of the overage and color-coded red. Additionally, or alternatively, productivity dashboard 332 may use other types of annotations to indicate the degree of error and/or the relative severity of the errors.

Figure 3C:
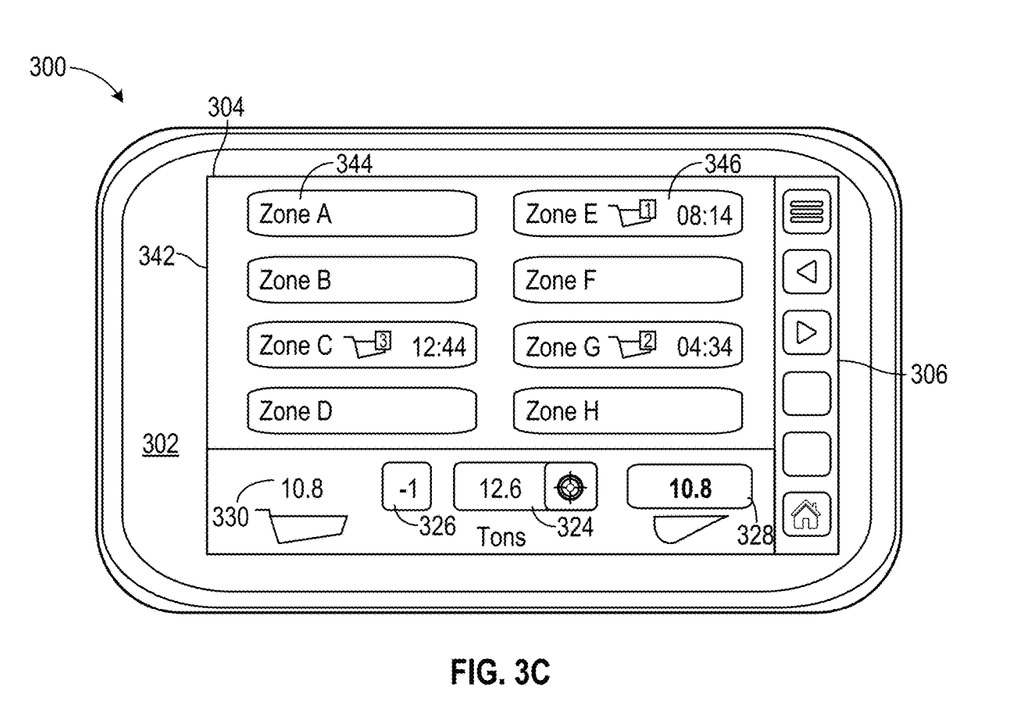

As shown in FIG. 3C, work order menu 304 may provide a worksite dashboard 342 relating to worksite data and/or other information associated with worksite 102 that an operator of work machine 200 may use for reference. For example, worksite dashboard 342 may include stockpile information 344, queue information 346, and/or other information relating to worksite 102 and/or worksite data. Stockpile information 344 may include information identifying locations of stockpiles 118 (e.g., Zones A-H) within worksite 102. Queue information 346 may include information identifying a respective number of haul machines 112 and respective wait times associated with stockpiles 118. In some examples, worksite dashboard 342 may include other worksite data (e.g., information identifying work machines 104 assigned to stockpiles 118, locations of work machines 104, weigh station 116, and/or haul machines 112 within worksite 102, and/or other reference information that can be used to facilitate an operation associated with worksite 102).

As indicated above, FIGS. 3A-3C are provided as an example. Other examples may differ from what is described in connection with FIGS. 3A-3C.

Figure 4:
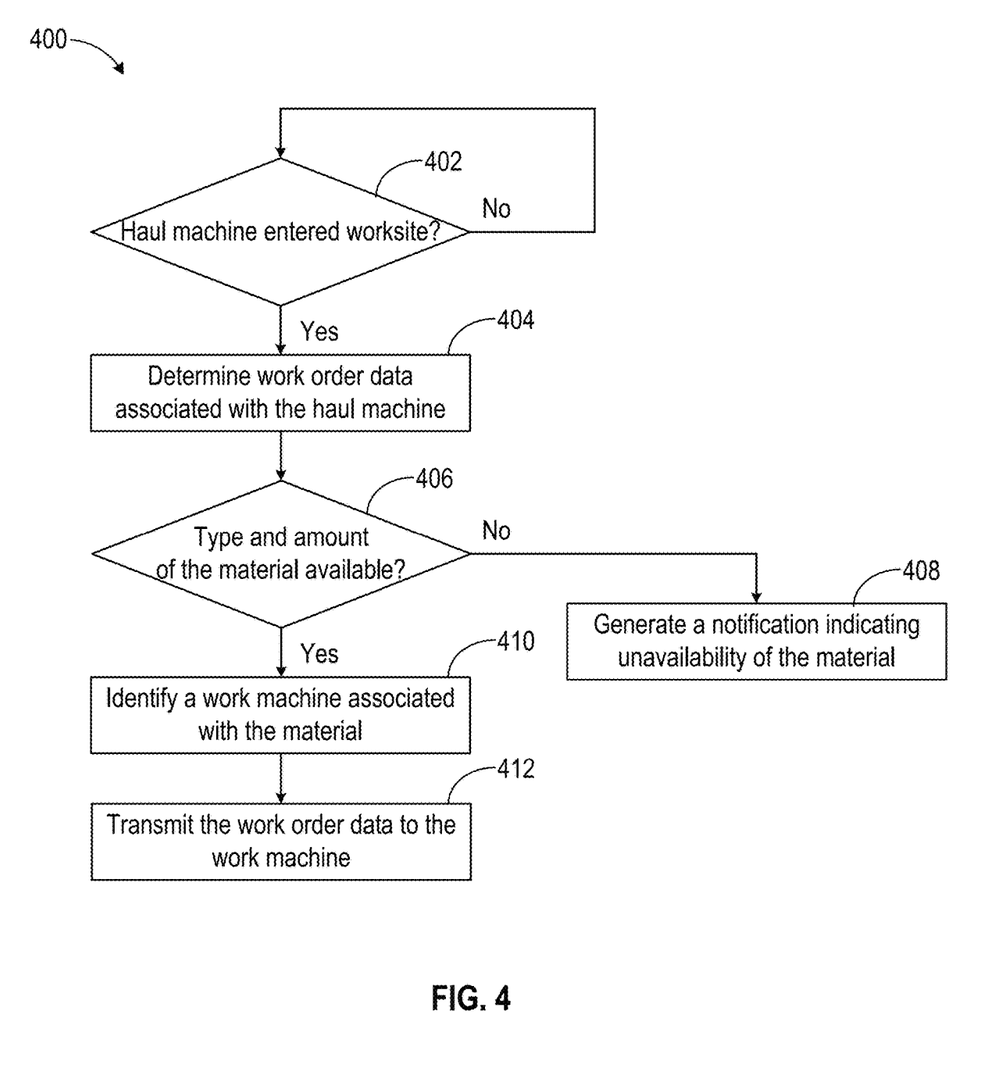
FIG. 4 is a flow chart of an example process for managing work orders of a worksite.

FIG. 4 is a flow chart of an example process 400 for managing work orders of a worksite. One or more process blocks of FIG. 4 may be performed by a management platform (e.g., management platform 106 of work order integration system 100) and/or by another component or a group of components separate from or including the management platform (e.g., control device 216 of work machine 200, control station 108, network storage device 110, haul machine 112, weigh station 116, and/or another device associated with work order integration system 100).

As shown in FIG. 4, process 400 may include determining when a haul machine enters a worksite (block 402). For example, the management platform may determine a location of the haul machine relative to the worksite to determine when the haul machine enters the worksite. In some examples, the management platform may determine when the haul machine enters the worksite by detecting a proximity of the haul machine relative to a reference location (e.g., an entryway, a weigh station, and/or another reference location associated with the worksite). The management platform may determine when a haul machine enters the worksite based on information provided by a communication device (e.g., an RF component, a positioning component, and/or the like) associated with the haul machine, the weigh station, and/or the like.

As further shown in FIG. 4, process 400 may include determining work order data associated with the haul machine (block 404). For example, the management platform may determine information identifying the haul machine, a type of material requested by the haul machine, an amount of the material requested by the haul machine, and/or other work order data associated with the haul machine. In some examples, the management platform may receive work order information from the haul machine, a control station, a network storage device, a weight station, and/or another device associated with the worksite, and determine the work order data based on the work order information. The work order information may include one or more of a haul machine identifier associated with the haul machine, a check-in time of the haul machine, a check-in weight of the haul machine, and/or other work order information. In some examples, the work order information may include a work machine identifier (e.g., a machine identification number and/or another unique identifier) associated with the work machine assigned to and/or otherwise associated with the material requested. For example, the work machine identifier may inform the haul machine and/or other work machines of the work machine assigned to the work order.

As further shown in FIG. 4, process 400 may include determining if the material requested for the haul machine is available at the worksite (block 406). For example, the management platform may determine an availability of a type and an amount of the material requested by the haul machine. In some examples, the management platform may identify inventory data associated with the worksite to determine an inventory amount of the material available at the worksite, and compare the amount of the material requested for the haul machine with the inventory amount of the material available at the worksite. The management platform may determine that the amount of the material is unavailable if the amount of the material requested exceeds the inventory amount of the material available at the worksite. The management platform may determine that the amount of the material is available if the amount of the material requested does not exceed the inventory amount of the material available at the worksite.

In some implementations, the inventory amount may correspond to a total amount of the material that is available within the worksite at a time the work order is received (e.g., at check-in time) irrespective of pending work orders (e.g., from other haul machines that may already be in queue and waiting to be loaded with the material). Additionally, or alternatively, the inventory amount may correspond to an anticipated amount of the material that would be available to the haul machine once the pending work orders are fulfilled. In such cases, the management platform may determine a projection of the inventory amount of the material based on work order data corresponding to the pending work orders. In some examples, the worksite may include multiple stockpiles of the material requested for the haul machine, and the inventory amount may correspond to an amount of the material available in a single stockpile of the material within the worksite. If a single stockpile does not have sufficient material to fulfill a work order, the management platform may determine availability based on whether the amount of the material requested is available from another stockpile and/or from multiple stockpiles within the worksite.

As further shown in FIG. 4, process 400 may include generating a notification indicating an unavailability of the material (block 408). For example, the management platform may generate a notification indicating an unavailability of the amount of the material, a remaining amount of the material that is available, an alternate source of the material, a lead time associated with replenishing the material, and/or the like. In some examples, the management platform may generate the notification to be transmitted to a user interface and/or a control device associated with the haul machine. Additionally, or alternatively, the management platform may generate the notification to be transmitted to a user interface and/or a control device associated with a work machine, a control station, a weigh station, and/or another device associated with the worksite. The notification may be configured to enable an operator of the haul machine to identify another source of the material and/or to notify an operator of the worksite to replenish the material.

As further shown in FIG. 4, process 400 may include identifying a work machine associated with the material based on determining that the amount of the material is available (block 410). For example, the management platform may identify the work machine based on worksite data associated with the worksite. The worksite data may include information identifying a stockpile of the material within the worksite and one or more work machines associated with the stockpile. The management platform may identify one of the work machines identified in the worksite data as the work machine associated with the material requested for the haul machine. In some examples, the management platform may receive location data (e.g., respective proximities of the work machines relative to the location of the material requested for the haul machine), and identify the work machine associated with the material based on the respective proximities of the work machines.

As further shown in FIG. 4, process 400 may include transmitting the work order data to the work machine (block 412). For example, the management platform may transmit the work order data determined for the haul machine to the work machine associated with the material requested for the haul machine. As described above, the management platform may transmit the work order data to a local operator of the work machines via a user interface and/or a control device associated with the work machine. In some examples, the management platform may transmit the work order data to a remote operator of the work machine via a control station and/or to an operator of a weigh station of the worksite. The work order data may include information relating to the type and the amount of material requested for the haul machine, a haul machine identifier, a location of the stockpile corresponding to the material, a check-in time of the haul machine, a check-in weight of the haul machine, and/or other information that can be used by the operator of the work machine to perform a loading operation.

In some implementations, the management platform may receive productivity data associated with a loading operation from the work machine during and/or after the loading operation. As described above, the productivity data may include information relating to a target amount of material used to perform the loading operation, an amount of material loaded onto haul machine and/or remaining in the loading operation, an amount of material loaded per implement pass, a number of implement passes performed and/or remaining for the loading operation, and/or other information that may be used to track a progress of the loading operation and/or operator performance. In some examples, the management platform may determine check-out data (e.g., a check-out weight, a check-out time, an actual amount of the material on the haul machine, and/or other information determined by a weigh station). The management platform may transmit the productivity data and/or the check-out data to the work machine, the haul machine, a control station, a network storage device, and/or another device associated with the worksite.

Process 400 may include variations and/or additional implementations to those described in connection with FIG. 4, such as any single implementation or any combination of implementations described elsewhere herein. Although FIG. 4 shows example blocks of process 400, in some examples, process 400 may include additional blocks, fewer blocks, different blocks, or differently arranged blocks than those depicted in FIG. 4. Additionally, or alternatively, two or more of the blocks of process 400 may be performed in parallel.

Figure 5:
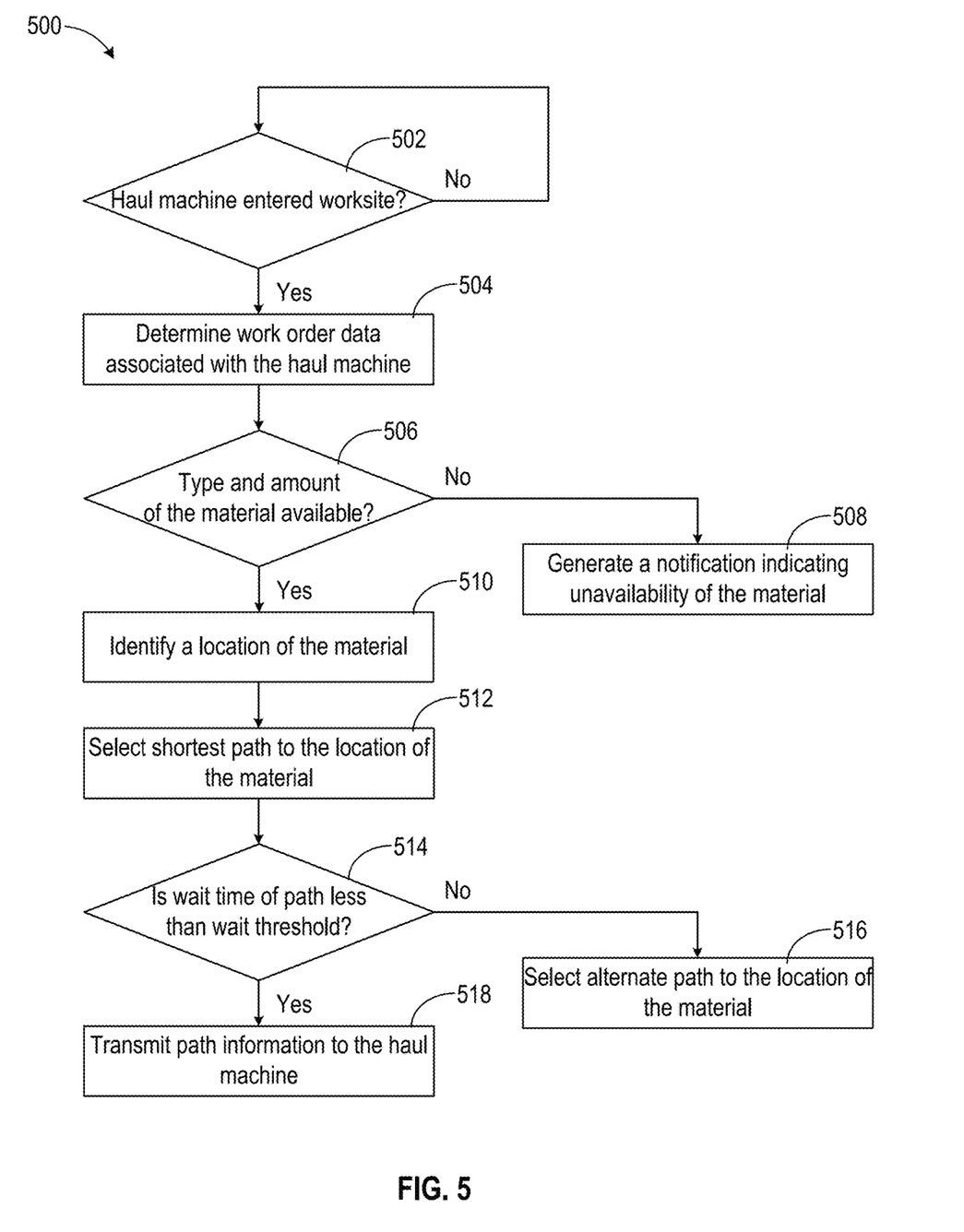
FIG. 5 is a flow chart of an example process for managing operations of a worksite.

FIG. 5 is a flow chart of an example process 500 for managing operations of a worksite. One or more process blocks of FIG. 5 may be performed by a management platform (e.g., management platform 106 of work order integration system 100) and/or by another component or a group of components separate from or including the management platform (e.g., control device 216 of work machine 200, control station 108, network storage device 110, haul machine 112, weigh station 116, and/or another device associated with work order integration system 100).

As shown in FIG. 5, process 500 may include determining when a haul machine enters a worksite (block 502). For example, the management platform may determine a location of the haul machine relative to the worksite to determine when the haul machine enters the worksite. In some examples, the management platform may determine when the haul machine enters the worksite by detecting a proximity of the haul machine relative to a reference location (e.g., an entryway, a weigh station, and/or another reference location associated with the worksite). The management platform may determine when a haul machine enters the worksite based on information provided by a communication device (e.g., an RF component, a positioning component, and/or the like) associated with the haul machine, the weigh station, and/or the like.

As further shown in FIG. 5, process 500 may include determining work order data associated with the haul machine (block 504). For example, the management platform may determine information identifying the haul machine, a type of material requested for the haul machine, an amount of the material requested for the haul machine, and/or other work order data associated with the haul machine. In some examples, the management platform may receive work order information from the haul machine, a control station, a network storage device, a weight station, and/or another device associated with the worksite, and determine the work order data based on the work order information. The work order information may include one or more of a haul machine identifier associated with the haul machine, a work machine identifier associated with the work machine, a check-in time of the haul machine, a check-in weight of the haul machine, and/or other work order information.

As further shown in FIG. 5, process 500 may include determining if the material requested for the haul machine is available at the worksite (block 506). For example, the management platform may determine an availability of a type and an amount of the material requested by the haul machine. In some examples, the management platform may identify inventory data associated with the worksite to determine an inventory amount of the material available at the worksite, and compare the amount of the material requested for the haul machine with the inventory amount of the material available at the worksite. The management platform may determine that the amount of the material is unavailable if the amount of the material requested exceeds the inventory amount of the material available at the worksite. The management platform may determine that the amount of the material is available if the amount of the material requested does not exceed the inventory amount of the material available at the worksite.

As further shown in FIG. 5, process 500 may include generating a notification indicating an unavailability of the material (block 508). For example, the management platform may generate a notification indicating an unavailability of the amount of the material, a remaining amount of the material that is available, an alternate source of the material, a lead time associated with replenishing the material, and/or other relevant information. In some examples, the management platform may generate the notification to be transmitted to a user interface and/or a control device associated with the haul machine. Additionally, or alternatively, the management platform may generate the notification to be transmitted to a user interface and/or a control device associated with a work machine, a control station, a weigh station, and/or another device associated with the worksite. The notification may be configured to enable an operator of the haul machine to identify another source of the material and/or to notify an operator of the worksite to replenish the material.

As further shown in FIG. 5, process 500 may include identifying a location of the material based on determining that the amount of the material requested for the haul machine is available (block 510). For example, the management platform may identify a location of a stockpile of the material within the worksite. In some examples, the management platform may identify worksite data (e.g., location information corresponding to the stockpile of the material within the worksite), and identify the location of the material based on the worksite data. In some examples, such as when a single stockpile does not have sufficient material to fulfill a work order, the management platform may determine if the amount of the material requested is available from another stockpile and/or from multiple stockpiles within the worksite. If the amount of the material requested is available from multiple stockpiles, the management platform may identify multiple locations of the material.

As further shown in FIG. 5, process 500 may include selecting a path to the location of the material (block 512). For example, the management platform may identify one or more prospective paths between the location of the haul machine and the location of the material, determine respective path lengths (e.g., travel distances, absolute distances, and/or the like) associated with the prospective paths, and select one of the prospective paths based on the respective path lengths (e.g., the path with the shortest path length). In some examples, such as when the material requested is available at multiple locations within the worksite, the management platform may identify prospective paths between the location of the haul machine and the multiple locations of the material, determine respective path lengths associated with the prospective paths, and select one of the prospective paths based on the respective path lengths.

As further shown in FIG. 5, process 500 may include determining a wait time associated with the selected path (block 514). For example, the management platform may identify a wait time associated with the selected path based on work order data (e.g., information relating to pending work orders from other haul machines that may already be in a queue associated with the selected path), productivity data (e.g., a rate of productivity of a work machine associated with the selected path), inventory data (e.g., time associated with producing additional material if there is a shortage of the material requested), and/or the like. In some examples, the management platform may compare the wait time with a wait threshold. For example, the wait threshold may correspond to a maximum wait time that is allowed for the haul machine. The wait threshold may be defined in part by an operator of the haul machine (e.g., based on a target schedule and/or another requirement associated with the haul machine), and/or defined in part by an operator of the worksite (e.g., based on a target rate of productivity and/or another requirement associated with the worksite). In some examples, the management platform may compare the wait time of the selected path with a plurality of maximum wait thresholds, one or more minimum wait thresholds, or a combination thereof.

As further shown in FIG. 5, process 500 may include selecting an alternate path to the location of the material (block 516). For example, the management platform may select an alternate path to the location of the material when the wait time of the selected path is equal to or greater than the wait threshold. In some examples, the management platform may identify the next shortest available path between the haul machine and the location of the material, and compare a wait time associated with the next shortest path with the wait threshold. If the wait time of the next shortest path is less than the wait threshold, the management platform may identify the next shortest path as the alternate path. In some examples, the management platform may identify a plurality of paths between the haul machine and the location of the material, determine respective path lengths and respective wait times associated with the prospective paths, and select one of the prospective paths based on the respective path lengths (e.g., the path with the shortest path length), the respective wait times (e.g., the path with the shortest wait time), and/or another factor.

As further shown in FIG. 5, process 500 may include transmitting path information to the haul machine (block 518). For example, the management platform may transmit information corresponding to the path (e.g., a selected path and/or an alternative path) to an operator of the haul machine via a control device and/or a user interface associated with the haul machine. In some examples, the management platform may generate a set of navigation instructions based on the path, and transmit the set of navigation instructions to a control device and/or a user interface associated with the haul machine. Additionally, or alternatively, the management platform may generate a map and/or another graphical representation of the worksite configured to identify the path for an operator of the haul machine. In some examples, the management platform may transmit the path information to a user interface and/or a control device of a work machine associated with the material, a control station, a network storage device, a weigh station, and/or another device associated with the worksite.

Process 500 may include variations and/or additional implementations to those described in connection with FIG. 5, such as any single implementation or any combination of implementations described elsewhere herein. Although FIG. 5 shows example blocks of process 500, in some examples, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

A quarry can have several stockpiles of a particular material and/or of different types of materials that are located throughout a worksite and ready to be loaded by a wheel loader onto a haul machine. A ticketing system may be used to track work orders submitted by haul machine operators and to facilitate loading operations performed by wheel loaders. The work order may identify a type and an amount of material requested for a haul machine. A wheel loader operator may receive the work order and load the material from the stockpile onto a bed of a haul machine according to the work order. A wheel loader may have an on-board scale system that measures a weight of the material in a bucket of the wheel loader, and a user interface that displays the weight of the material in the bucket to the wheel loader operator. In some cases, the user interface may enable the wheel loader operator to enter a target weight of the material to be loaded onto the haul machine. During a loading operation, the wheel loader operator may be able to use the target weight to track a weight of the material that has already been loaded onto the haul machine and/or a remaining weight of the material to be loaded onto the haul machine.

A work order integration system described herein provides a management platform and a work machine control device that enable efficiency, accuracy, and productivity improvements to quarry or other comparable operations. For example, the work order integration system may determine a location of a haul machine relative to a worksite, determine work order data associated with the haul machine, determine an availability of a material requested for the haul machine based on the work order data, identify a location of the material, identify a shortest and/or quickest path to the location of the material for the haul machine, and transmit the work order data to a work machine associated with the material. In some examples, the work order integration system may enable the work machine control device to receive the work order data associated with the haul machine, set an operating parameter of the work machine to perform a loading operation according to the work order data, receive payload data associated with a payload of the work machine, determine productivity data associated with the loading operation based on the payload data, and generate a record of the productivity data.

Accordingly, the work order integration system provides several technological advantages relative to currently available ticketing systems. For instance, by using the work order data to directly configure the work machine, the work order integration system minimizes a potential for operator error in configuring the work machine, improves an accuracy of loading operations performed by the work machine, and conserves time, fuel, and/or other resources that may otherwise be needed to correct for inaccurate loads (e.g., loading the haul machine with an incorrect type of material, more than the amount of material requested, less than the amount of material requested, and/or the like). Also, by tracking payload data and/or productivity data associated with loading operations, the work order integration system provides a mechanism for validating weigh station measurements and maintaining an accurate inventory of materials available within a worksite. Furthermore, by verifying availability, stockpile locations, wait times, and/or optimal paths associated with a material requested for a haul machine at check-in and prior to allowing the haul machine to proceed further into the worksite, the work order integration system enables a haul machine operator to avoid unnecessary delays and loss in productivity that may otherwise occur.

What is claimed is:

1. A worksite management device, comprising:
   one or more memories;
   and one or more processors, communicatively coupled to the one or more memories, configured to:
   determine a location of a haul machine relative to a worksite based on information provided by a communication device associated with the haul machine;
   determine work order data associated with the haul machine, the work order data identifying a material requested for the haul machine and an amount of the material requested for the haul machine;
   determine an availability of the amount of the material requested for the haul machine;
   identify one or more locations of the material based on determining that the amount of the material is available, one or more stockpiles of the material being located at the one or more locations, the amount of the material being sufficient to fulfill a work order identified by the work order data, and the one or more stockpiles including the amount of the material;
   identify prospective paths between the haul machine and the one or more locations;

determine respective path lengths associated with the prospective paths;

select a shortest path of the prospective paths based on the respective path lengths;

and cause the haul machine to autonomously or semi-autonomously navigate the shortest path.

2. The worksite management device of claim 1, wherein the one or more processors, when determining the availability of the amount of the material, are configured to:

identify inventory data associated with the worksite, the inventory data including an inventory amount of the material available at the worksite;

compare the amount of the material requested for the haul machine with the inventory amount of the material available at the worksite; and determine that the amount of the material is available based on determining that the amount of the material requested for the haul machine does not exceed the inventory amount of the material available at the worksite.

3. The worksite management device of claim 1, wherein the one or more processors, when identifying the one or more locations, are configured to:

identify worksite data associated with the worksite;

the worksite data including location information corresponding to the one or more stockpiles;

and identify the one or more locations based on the worksite data.

4. The worksite management device of claim 1, wherein the one or more processors, when selecting the shortest path, are configured to:

determine respective wait times associated with the prospective paths;

identify a first prospective path associated with a shortest path length of the respective path lengths;

determine that a first wait time, associated with the first prospective path, exceeds a wait threshold;

identify a second prospective path associated with a next shortest path length out of the respective path lengths;

determine that a second wait time, associated with the second prospective path, is less than the wait threshold;

and select the second prospective path as the shortest path.

5. The worksite management device of claim 1, wherein, to cause the haul machine to autonomously or semi-autonomously navigate the shortest path, the one or more processors are configured to:

generate a set of navigation instructions based on the shortest path;

and transmit the set of navigation instructions to one or more of a user interface or a control device associated with the haul machine to cause the haul machine to autonomously or semi-autonomously navigate the shortest path.

6. The worksite management device of claim 1, wherein the one or more processors are further configured to:

generate a notification based on determining that a different amount of the material is unavailable, the notification indicating one or more of an unavailability of the different amount of the material, a remaining amount of the material that is available, an alternate source of the material, or a lead time associated with replenishing the material.

7. A method, comprising:

determining, by a device, a location of a haul machine relative to a worksite, the location of the haul machine being determined based on information provided by a communication device associated with the haul machine;

determining, by the device, work order data associated with the haul machine, the work order data identifying one or more of the haul machine, a material requested for the haul machine, or an amount of the material requested for the haul machine;

determining, by the device, an availability of the amount of the material requested for the haul machine;

identifying, by the device, one or more locations of the material based on determining that the amount of the material is available, one or more stockpiles of the material being located at the one or more locations, and the amount of the material being sufficient to fulfill a work order identified by the work order data, and the one or more stockpiles including the amount of the material;

identifying, by the device, prospective paths between the haul machine and the one or more locations;

determining, by the device, respective path lengths associated with the prospective paths;

selecting, by the device, a path between the location of the haul machine and the one or more locations, the path being selected as a shortest path of the prospective paths;

and transmitting, by the device, information relating to the path to the haul machine to cause the haul machine to autonomously or semi-autonomously navigate the path;

identifying, by the device, a work machine associated with the material requested for the haul machine, the work machine being identified, based on location data of the work machine, as a closest work machine out of one or more work machines;

and transmitting, by the device, the work order data to the work machine.

8. The method of claim 7, wherein determining the work order data comprises:

receiving work order information from one or more of the haul machine, a worksite management device associated with the worksite, or a network storage device associated with the worksite management device, the work order information including one or more of a haul machine identifier associated with the haul machine, a work machine identifier associated with the work machine, a check-in time of the haul machine, or a check-in weight of the haul machine; and determining the work order data based on the work order information.

9. The method of claim 7, wherein identifying the work machine associated with the material comprises:

identifying worksite data associated with the worksite, the worksite data including information identifying the one or more stockpiles within the worksite and one or more work machines associated with the one or more stockpiles;

and identifying one of the one or more work machines, associated with the one or more stockpiles, as the work machine associated with the material requested for the haul machine.

10. The method of claim 7, wherein identifying the work machine associated with the material comprises:

receiving location data associated with one or more work machines of the worksite, the location data identifying respective proximities of the one or more work machines, of the worksite, relative to the one or more locations;

and identifying one of the one or more work machines, of the worksite, as the work machine associated with the material requested for the haul machine based on the respective proximities.

11. The method of claim 7, wherein identifying the one or more locations comprises:

identifying additional locations of the material based on determining that the amount of the material requested for the haul machine is not available at one or more other locations of the material;

wherein the additional locations include the one or more locations.

12. The method of claim 7, further comprising:

receiving productivity data from the work machine, the productivity data corresponding to a loading operation performed by the work machine and including information relating to a target amount of the material loaded onto the haul machine;

determining check-out data associated with the haul machine, the check-out data including information relating to an actual amount of the material loaded onto the haul machine; and transmitting the productivity data and the check-out data to one or more of the work machine, the haul machine, a worksite management device associated with the worksite, or a network storage device associated with the worksite management device.

13. A non-transitory computer-readable medium storing a set of instructions, the set of instructions comprising:

one or more instructions that, when executed by one or more processors of a device, cause the device to;

determine a location of a haul machine relative to a worksite based on information provided by a communication device associated with the haul machine;

determine work order data associated with the haul machine, the work order data identifying a material requested for the haul machine and an amount of the material requested for the haul machine;

determine an availability of the amount of the material requested for the haul machine;

identify one or more locations of the material based on determining that the amount of the material is available, one or more stockpiles of the material being located at the one or more locations, and the amount of the material being sufficient to fulfill a work order identified by the work order data, and the one or more stockpiles including the amount of the material;

identify prospective paths between the haul machine and the one or more locations;

determine respective path lengths associated with the prospective paths;

select a path between the location of the haul machine and the one or more locations, the path being selected as a shortest path of the prospective paths;

and cause the haul machine to autonomously or semi-autonomously navigate the path.

14. The non-transitory computer-readable medium of claim 13, wherein the one or more instructions, that cause the device to determine the availability of the amount of the material, further cause the device to:

identify inventory data associated with the worksite, the inventory data including an inventory amount of the material available at the worksite;

compare the amount of the material requested for the haul machine with the inventory amount of the material available at the worksite; and determine that the amount of the material is available based on determining that the amount of the material requested for the haul machine does not exceed the inventory amount of the material available at the worksite.

15. The non-transitory computer-readable medium of claim 13, wherein the one or more instructions, that cause the device to identify the one or more locations, further cause the device to:

identify worksite data associated with the worksite, the worksite data including location information corresponding to the one or more stockpiles;

and identify the one or more locations based on the worksite data.

16. The non-transitory computer-readable medium of claim 13, wherein the one or more instructions, that cause the device to select the path, further cause the device to:

determine respective wait times associated with the prospective paths;

and select one of the prospective paths based on the respective path lengths and the respective wait times.

17. The non-transitory computer-readable medium of claim 13, wherein the one or more instructions further cause the device to:

generate a set of navigation instructions based on the path; and transmit the set of navigation instructions to one or more of a user interface or a control device associated with the haul machine to cause the haul machine to autonomously or semi-autonomously navigate the path.

18. The non-transitory computer-readable medium of claim 13, wherein the one or more instructions, that cause the device to select the path, further cause the device to:

generate a notification based on determining that amount of the material is unavailable, the notification indicating one or more of an unavailability of the amount of the material, a remaining amount of the material that is available, an alternate source of the material, or a lead time associated with replenishing the material.

19. The non-transitory computer-readable medium of claim 13, wherein the one or more instructions further cause the device to:

identify a work machine associated with the material requested for the haul machine, the work machine being identified, based on location data of the work machine, as a closest work machine out of one or more work machines; and transmit the work order data to the work machine.

20. The non-transitory computer-readable medium of claim 19, wherein the one or more instructions, that cause the device to determine the work order data, further cause the device to:

receive work order information from one or more of the haul machine, a worksite management device associated with the worksite, or a network storage device associated with the worksite management device, the work order information including one or more of a haul machine identifier associated with the haul machine, a work machine identifier associated with the work machine, a check-in time of the haul machine, or a check-in weight of the haul machine; and determine the work order data based on the work order information.

\* \* \* \* \*